US006836823B2

United States Patent
Burton

(12) United States Patent
(10) Patent No.: US 6,836,823 B2
(45) Date of Patent: Dec. 28, 2004

(54) BANDWIDTH ENHANCEMENT FOR UNCACHED DEVICES

(75) Inventor: Lee Burton, Divide, CO (US)

(73) Assignee: SRC Computers, Inc., Colorado Springs, CO (US)

(*) Notice: Subject to any disclaimer, the term of this patent is extended or adjusted under 35 U.S.C. 154(b) by 389 days.

(21) Appl. No.: 10/008,128

(22) Filed: Nov. 5, 2001

(65) Prior Publication Data
US 2003/0088737 A1 May 8, 2003

(51) Int. Cl.[7] ............................................. G06F 13/00
(52) U.S. Cl. ........................ 711/117; 711/165; 711/170
(58) Field of Search .............................. 711/118, 165, 711/170

(56) References Cited

U.S. PATENT DOCUMENTS

| | | | | |
|---|---|---|---|---|
| 5,737,524 A | | 4/1998 | Cohen et al. | |
| 5,872,919 A | * | 2/1999 | Wakeland | 709/230 |
| 5,915,104 A | | 6/1999 | Miller | |
| 5,953,512 A | * | 9/1999 | Cai et al. | 712/205 |
| 6,000,014 A | * | 12/1999 | Arimilli et al. | 711/128 |
| 6,104,415 A | * | 8/2000 | Gossett | 345/552 |
| 6,216,219 B1 | * | 4/2001 | Cai et al. | 712/207 |
| 6,339,819 B1 | * | 1/2002 | Huppenthal et al. | 712/16 |
| 2003/0046530 A1 | * | 3/2003 | Poznanovic | 713/100 |

* cited by examiner

Primary Examiner—Reba I. Elmore
(74) Attorney, Agent, or Firm—William J. Kubida; Peter J. Meza; Hogan & Hartson LLP

(57) ABSTRACT

A system and method for enhancing the utilization of available bandwidth for an uncached device. Data written to the device is done so by striding the available data into multiple data elements of the appropriate size for the uncached device. Data read from the device is retrieved from multiple addresses on the uncached device to avoid unnecessary waits cycles in the processor.

13 Claims, 5 Drawing Sheets

| $W_0$ $W_1$ $W_2$ $W_3$ | $W_4$ $W_5$ $W_6$ $W_7$ | $W_8$ $W_9$ $W_{10}$ $W_{11}$ | $W_{12}$ $W_{13}$ $W_{14}$ $W_{15}$ |

Fig. 2

| $W_0$ $W_1$ $W_2$ $W_3$ | | | |

Fig. 3

| $W_0$ $W_1$ $W_2$ $W_3$ | | | |

| $W_0$ | | | |

| $W_1$ | | | |

| $W_2$ | | | |

| $W_3$ | | | |

Fig. 4

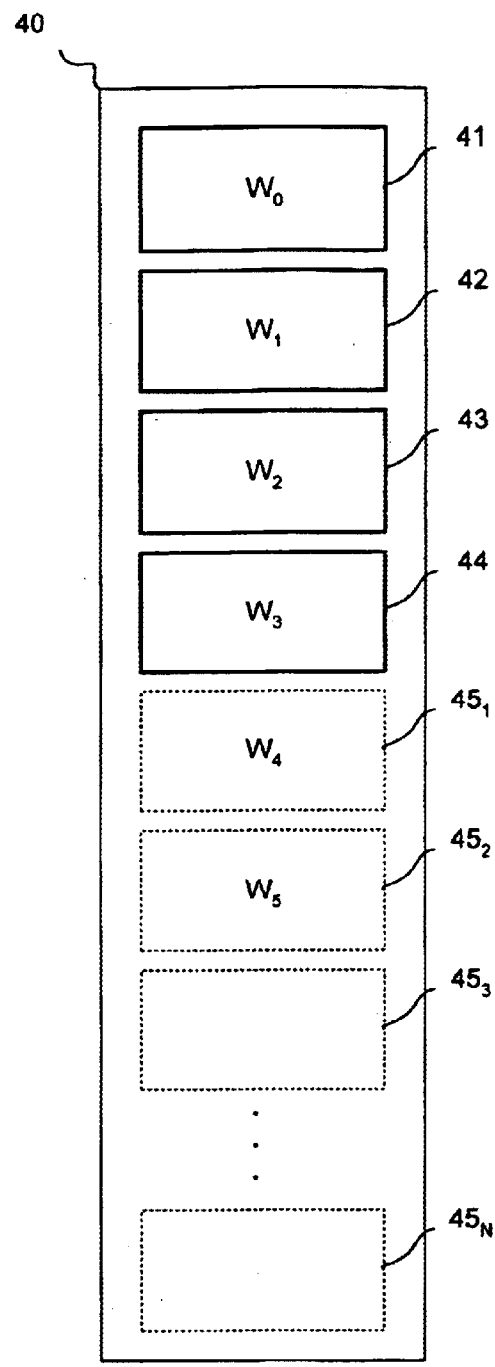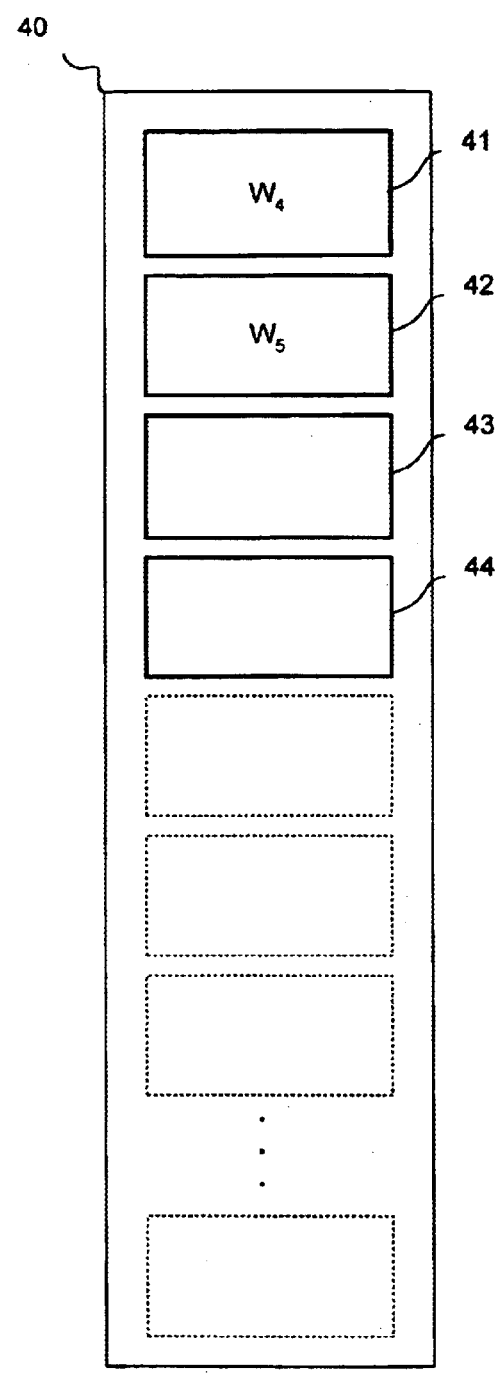
Fig. 6
Fig. 7

BANDWIDTH ENHANCEMENT FOR UNCACHED DEVICES

BACKGROUND OF THE INVENTION

1. Field of the Invention

The present invention relates to a system and method for enhancing the bandwidth utilization for uncached devices in a computer system, and more particularly, the invention relates to a system and method for maximizing the utilization of the available bandwidth for a reconfigurable processor incorporated within a computer system.

2. Discussion of the Related Art

Modern microprocessors are designed to maximize their performance through the use of cache memory located very closely to the processor core. A cache memory stores a subset of the most recently and frequently used contents of a computer system's main memory. Cache memories can provide data to microprocessors much faster than main memory. This is so for several reasons. The memory cache is often made of higher quality memory circuits than the main memory. These high-end circuits can simply operate at a higher clock rate than the main memory. In addition, there may also be a dedicated bus between the microprocessor and the cache memory that results in higher bandwidth between the microprocessor and the main memory. Finally, to take advantage of temporal locality, a cache memory is physically located much closer to the microprocessor than main memory, and in some cases is integrated on the same circuit as the microprocessor.

By first accessing the cache memory, as opposed to more physically distant main memory, the microprocessor reduces its memory access latency and accelerates its processing throughput. Only when an item is not found in the cache does the microprocessor need to retrieve it from main memory and place it in the cache for future use. When a particular piece of data is accessed, it is very likely that nearby units of data will also be accessed shortly. To take advantage of this spatial locality, a block of data larger than is currently needed is generally written into the cache when main memory is accessed. Cache memory is typically organized as rows of data, wherein each row is the length of the data block fetched from memory. Each of these rows is known as a cache line. Each fetch from memory returns the same cache line width size block of data. For efficiency, each bus that interacts with the cache does so on a cache line basis. In other words, all data transfers are done in the cache line size.

Using cached memory poses problems in a microprocessor-based system that also contains devices associated with the memory subsystem that are not normal memory chips. One such example is a reconfigurable processor such as SRC's Multi-Adaptive Processor ("MAP") units. These MAP units decode normal memory addresses into commands that the reconfigurable logic will execute. Such command sets will, among other things, contain commands to write operands to the first-in/first-out receive queue ("receive FIFO") on the MAP, as well as read results from a first-in/first-out output queue ("output FIFO") located on the MAP.

Due to reductions in a processor's efficiency, as well as the limitations of an uncached device's ability to use cache line sized data, it is necessary to permit the read and write requests to bypass the cache and go directly to where the uncached device resides. Fortunately, most microprocessors will allow for uncached memory references that will do just that. These uncached memory references, however, require a response from the uncached device before the next transaction can by issued. In uncached mode the processor will send a read request, for example, directly to the main memory and wait for the appropriate response. In a large system this response may take time equal to several microprocessor transaction periods. For this reason microprocessors will have an execution queue that allows it to initiate multiple transactions to different addresses before the response to the first transaction is received. This method maximizes the input/output bandwidth of the microprocessor.

If the microprocessor is attempting to read the results stored in an output FIFO, as is the case with a MAP, the address that is decoded into the MAP READ command would be requested by the processor. This address correlates to the front end of the output FIFO of the MAP, which does not change no matter how long or short the output FIFO might be. However, because any subsequent MAP READ command will attempt to access the same address, the microprocessor will not issue a second MAP READ command until a response from the first command is received, regardless of the depth of the microprocessor's execution queue. Waiting for a response significantly reduces the efficiency of the processor's use of the available resources.

The reason for this delay is that as the microprocessor program is executing, and because the cache has been bypassed, the microprocessor sees that the address for the second main memory access is the same as the first. In this situation the microprocessor is aware that it already has an outstanding request to that address and must halt any further use of that address until the first response is received.

A similar issue arises during a write command to an uncached device. An uncached device is typically unable to handle a full cache line of data. In the case of a MAP, the commands to be written to the MAP can be even shorter than the amount of data capable of being transferred to an uncached device. Reading from memory for each of these data elements significantly reduces the efficiency with which the computer system transfers data. Writing a full line of data creates an additional burden for the MAP unit.

SUMMARY OF THE INVENTION

Accordingly, the present invention is directed to a system and method for enhancing the utilization of the available bandwidth for an uncached device that substantially obviates one or more of the problems due to limitations and disadvantages of the related art.

An object of the present invention is to provide a system and method for efficiently utilizing the bandwidth for an uncached memory read request.

Another object of the present invention is to provide a method for efficiently utilizing the bandwidth for an uncached memory write request.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

In one embodiment, the invention comprises a method for writing data to an uncached device within a computer system, comprising the steps of receiving by a processor a request to write data to an uncached device, requesting the data by the processor, receiving the data by the processor, striding a section of the data into an optimized number of successive cache line addresses in the uncached device address space, and writing the successive cache line addresses to the uncached device.

In a further embodiment, the invention comprises a method for reading data from an uncached device within a computer system, comprising the steps of receiving by a processor a request to read data from an uncached device, retrieving the data from multiple addresses located on the uncached device, combining the multiple addresses into one or more cache line formatted data blocks, and writing the one or more cache line data blocks to memory.

In yet a further embodiment, the invention comprises a system for achieving enhanced bandwidth utilization for an uncached device, comprising at least one processor, a memory, and an uncached device containing a plurality of addresses mapped as memory addresses. At least one processor is programmed to spread a cache line block of data into multiple lines of data useable by the uncached device, write the multiple lines of data to the uncached device, read multiple lines of data from the uncached device, and combine the multiple lines of data into a cache line block.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 2 is a diagram depicting a typical cache line transfer block of data on a data bus;

FIG. 3 is a diagram depicting a maximum uncached transfer block of data on a data bus;

FIG. 4 is a diagram depicting the spreading of a cache line of data into four uncached transfer blocks of 2-byte commands;

FIG. 6 is a diagram depicting the output FIFO of the MAP unit prior to a read request from the processor;

FIG. 7 is a diagram depicting the output FIFO of the MAP unit after a read request to four addresses from the processor.

DETAILED DESCRIPTION OF THE PREFERRED EMBODIMENTS

Reference will now be made in detail to a preferred embodiment of the present invention, examples of which are illustrated in the accompanying drawings.

For purposes of describing this embodiment of the present invention, the examples shown, including the drawings, assume the use of a Pentium III class microprocessor. In particular, a cache-line width of 32-bytes, an uncached data width of 8-bytes, and a maximum execution queue length of four are assumed.

Figure 1:
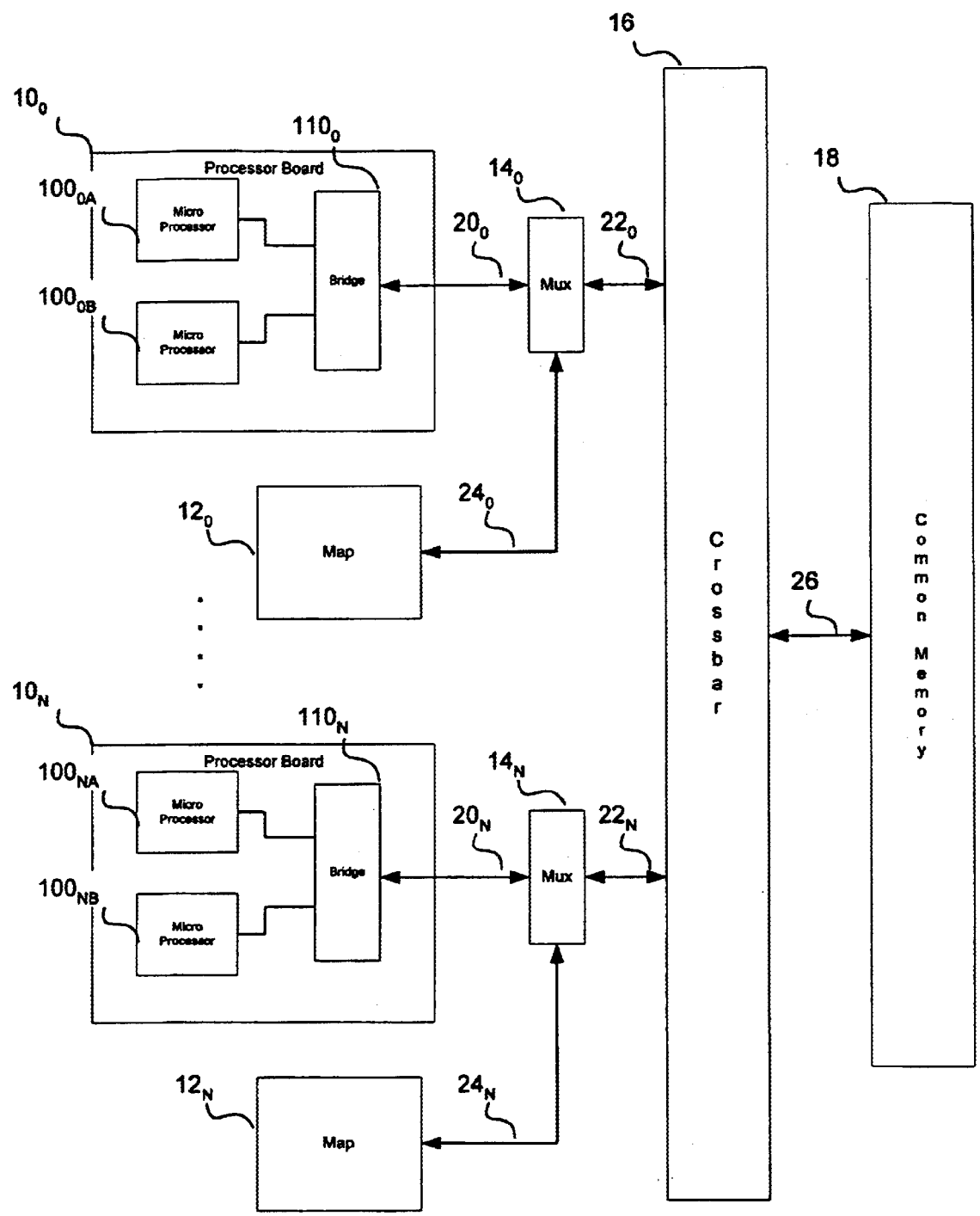
FIG. 1 is a simplified overview diagram of a hybrid computer system including reconfigurable processors.

Referring to FIG. 1, a hybrid multi-processor computer system including processors and reconfigurable processors is shown with processor boards $10_0$–$10_N$. Referring to the first processor board $10_0$, it contains two processors $100_{0A}$ and $100_{0B}$. Each processor connects to a bridge $110_0$ that in turn connects to a multiplexer $14_0$ via data bus $20_0$. In a further embodiment of the processor board $10_j$, the processors $100_{j\ A+B}$ are connected to an uncached device $111_j$ through a Memory I/O bridge $110_j$.

The multiplexers $14_0$–$14_N$ are switches to direct data to and from either the common memory 18 via the crossbar 16, or the MAP devices $12_0$–$12_N$. The MAP devices $12_0$–$12_N$ are shown on the processor side of the crossbar 16. Further embodiments of the hybrid computer system may place a MAP on the memory side of the crossbar 16, or in various other locations in the computer system. In any of these configurations the present invention will operate in a similar manner. Each bus $20_0$–$20_N$, $22_0$–$22_N$, $24_0$–$24_N$, and 26 communicates via a 32-byte cache line protocol. In other words, data passed along these paths are in blocks 32-bytes, or 16-words $W_0$–$W_{15}$, wide.

Referring to FIGS. 2 and 3, a 16-word $W_0$–$W_{15}$ cache line is represented in FIG. 2. A processor of the type used in the accompanying examples is only capable of transferring four words $W_0$–$W_3$ of data at a time to an uncached device, such as the MAP. FIG. 3 represents the available four words $W_0$–$W_3$ from the cache line. The last 12 words $W_4$–$W_{15}$ of a cache line are invalid and unusable when communicating with an uncached device.

Referring to FIG. 4, during a write to the MAP the microprocessor fetches a standard 32-byte cache line from common memory. A MAP command of 2-bytes is used for the current example. There are up to sixteen 2-byte commands within the cache line of data read by the processor. In order to avoid the delay of waiting for the individual write transactions to complete serially, the addresses of the write transactions to the MAP are stridden on cache line boundaries so that the transaction depth of the microprocessor can be fully utilized. Because each write transfer uses a different cache line address, all of which map into the receive FIFO of the MAP device, the microprocessor can issue as many of these transactions as is allowed by the transaction depth of the processor. As the microprocessor receives the reply to the write transactions, and the transaction queue is drained, more write transactions can be issued. This sequence is continued until the cache line of data is consumed, and the next cache line is fetched from common memory.

Figure 5:
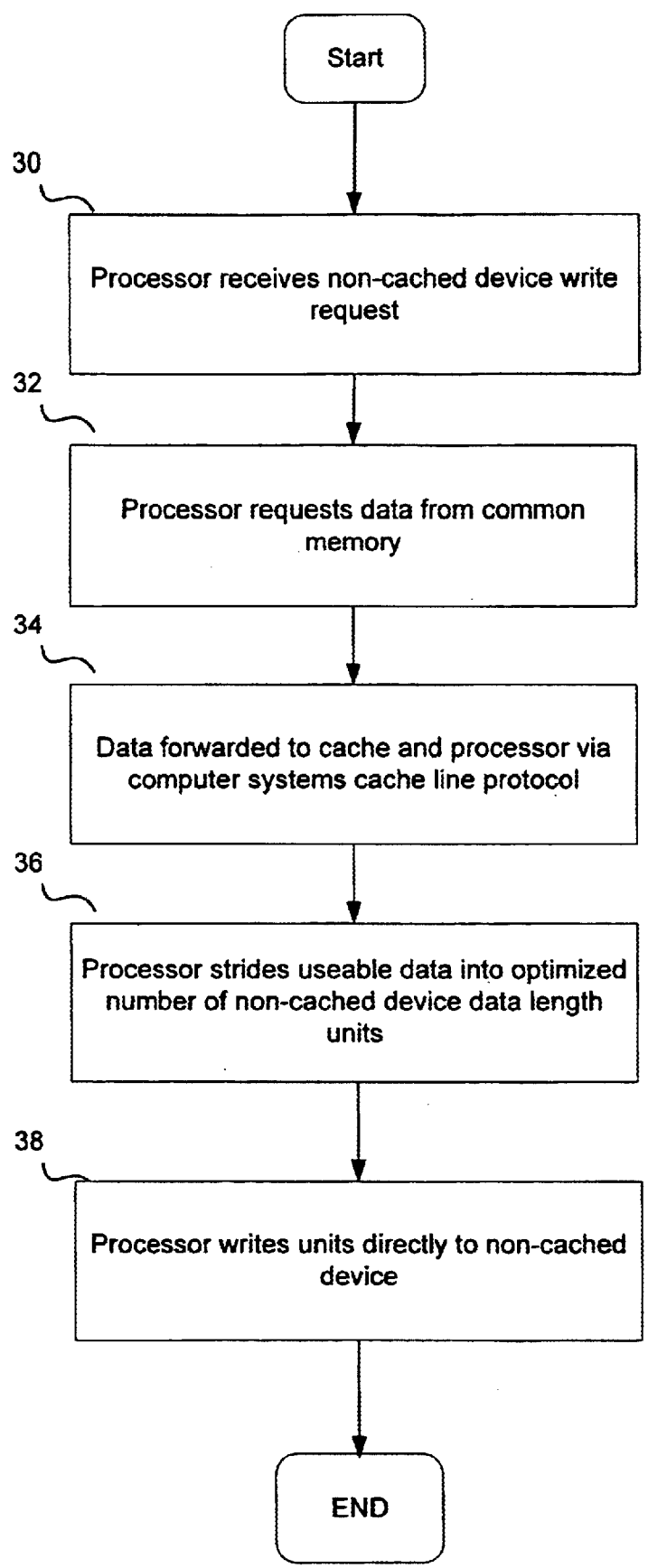
FIG. 5 is a flow chart representing the method for writing data to an uncached device.

Referring to FIG. 5, the method of handling a write request for an uncached device according to the present invention includes the steps as follows. The processor receives an uncached device write request, step 30. The processor retrieves a data block, equivalent to the processor's cache line width, from the cached common memory address space, step 32. The data is written to the cache and available to the processor, step 34. The processor spreads the useable data onto successive cache lines, step 36. The processor writes the data to multiple addresses of the receive FIFO of the uncached device using the maximum number of write commands permitted by the transaction queue, step 38. If additional data is available in the cache line, steps 36 and 38 are repeated, step 39.

Referring to FIG. 6, a read command virtually reverses the process. A first-in/first-out queue 40, or output FIFO, is located on each MAP device. The output FIFO 40 provides a queue for information ready to be read from the MAP. The top of the queue includes four consecutive addresses 41–44 that are mapped as memory locations for the processor. The tail addresses of the queue $45_1$–$45_N$ are not mapped, but simply provide additional space for the queue to grow.

By providing multiple consecutive cache line addresses 41–44 a processor can request data from each one without waiting for the response delay that accompanies a request to an identical address. The optimum number of these addresses is equal to the main memory latency divided by the microprocessor transaction period, or the execution queue depth of the processor, which ever is smaller. The SRC-6 computer with Intel Pentium III processors, and MAP devices can be used as an example. The Pentium III processor has an execution queue depth of four, which is smaller than the main memory latency divided by 50 ns per transaction. Therefore, the present invention alleviates the processor waits by mapping the first four addresses in the output FIFO 41–44. With four addresses the processor is able to request data from all four simultaneously in lieu of four single requests to one address at the front of the queue. The four data elements read from the front of the queue are subsequently loaded into a single cache line represented by FIG. 3 and written to memory.

Referring to FIG. 7, once these four data items have been read from the output FIFO 40, any remaining contents of the output FIFO 40 are moved to the front of the queue. Once the remaining data has been moved to occupy the first four addresses of the queue 41–44 it can be read in the same manner as the first four data items.

Figure 8:
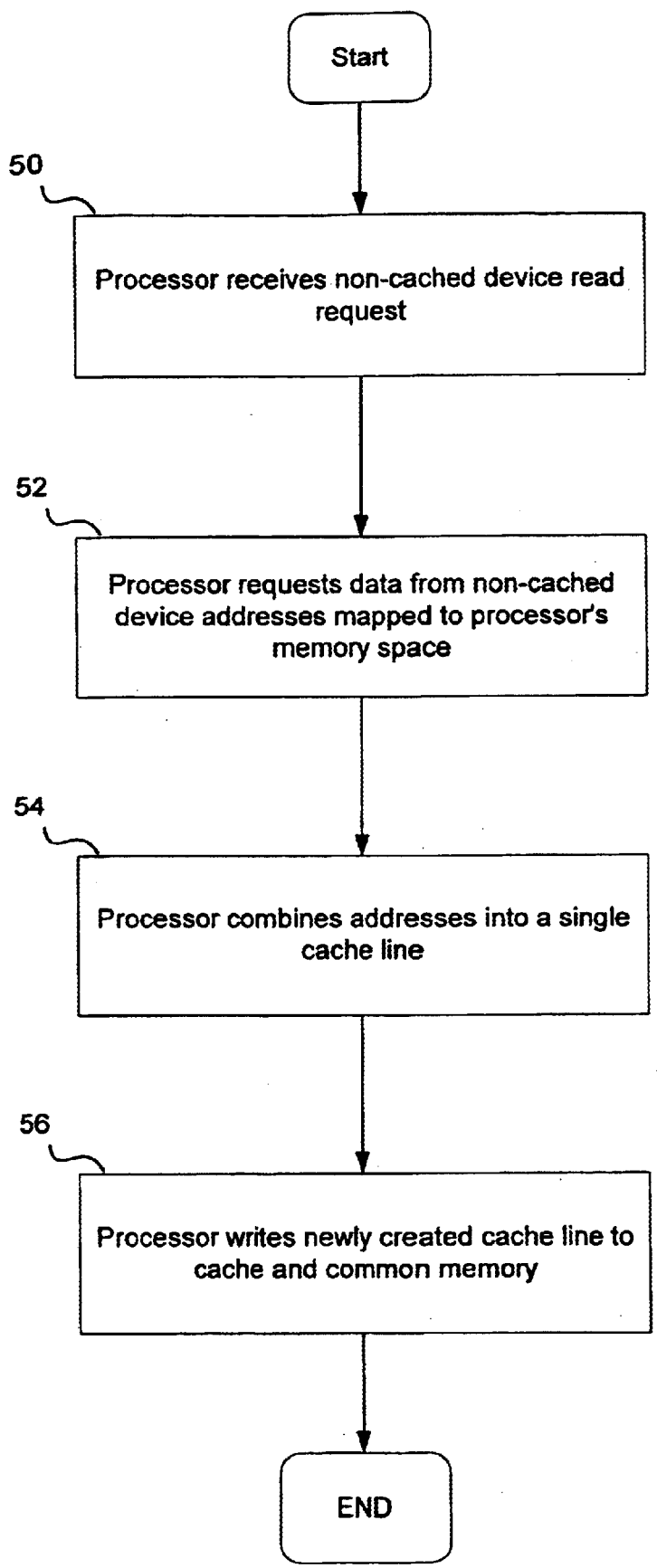
FIG. 8 is a flow chart representing the method for reading data from an uncached device.

Referring to FIG. 8, the method of reading from an uncached device, according to the present invention, is as follows. The processor receives a request for a read to an uncached device, step 50. The processor requests data located in the four successive cache line memory addresses associated with the uncached device, step 52. The processor combines the data from these addresses into a single cache line, step 54. The processor writes the newly formed cache line to the cache and common memory, step 56.

It will be apparent to those skilled in the art that various modifications and variations can be made in the method for bandwidth enhancement of the present invention without departing from the spirit or scope of the invention. Thus, it is intended that the present invention covers the modifications and variations of this invention provided that they come within the scope of any claims and their equivalents.

What is claimed is:

1. A method for writing data to an uncached device within a computer system, said method comprising the steps of:
   receiving by a processor a request to write data to an uncached device;
   requesting the data by the processor;
   receiving the data by the processor;
   striding a section of the data Into an optimized number of successive cache line addresses in the uncached device address space; and
   writing the successive cache line addresses to the uncached device.

2. The method of claim 1 further comprising the steps of:
   receiving by the processor a reply to each cache line address writings.

3. The method of claim 1, wherein the step of requesting the data further comprises the step of requesting a cache line block of data.

4. The method of claim 1, wherein the step of receiving the data by the processor further comprises the step of saving the data in the processor's cache.

5. The method of claim 1 further comprising the step of optimizing the number of cache line addresses by using the number of addresses equivalent to the processor execution queue depth.

6. The method of claim 1 further comprising the step of issuing the maximum number of write commands permitted by the processor's transaction queue.

7. The method of claim 1, wherein the step of striding a section of data comprises striding all of the data.

8. A method for reading data from an uncached device within a computer system, said method comprising the steps of:
   receiving by a processor a request to read data from an uncached device;
   retrieving the data from multiple addresses located on the uncached device;
   combining the multiple addresses into one or more cache line formatted data blocks; and
   writing the one or more cache line data blocks to memory.

9. The method of claim 8, further comprising the step of determining the optimum number of uncached addresses.

10. The method of claim 9 wherein the determining the optimum number of uncached addresses further comprises the steps of:
   calculating a first number by dividing the main memory latency by the processor's transaction period;
   calculating a second number by using the length of the processor's execution queue; and
   using the lesser of the two as the optimum number of uncached addresses.

11. A system for achieving enhanced bandwidth utilization for an uncached device, comprising:
   at least one processor;
   a memory; and
   an uncached device containing a plurality of addresses mapped as memory addresses
   at least one processor programmed to:
      spread a cache line block of data into multiple lines of data useable by the uncached device,
      write the multiple lines of data to the uncached device,
      read multiple lines of data from the uncached device, and
      combine the multiple lines of data into a cache line block.

12. The system of claim 11, wherein the plurality of addresses comprise a first-in/first-out queue.

13. The system of claim 11, wherein the plurality of addresses comprise a first-in/first-out queue.

* * * * *

UNITED STATES PATENT AND TRADEMARK OFFICE
CERTIFICATE OF CORRECTION

PATENT NO. : 6,836,823 B2
DATED : December 28, 2004
INVENTOR(S) : Lee Burton

It is certified that error appears in the above-identified patent and that said Letters Patent is hereby corrected as shown below:

Column 5,
Line 52, "Into" should be -- into --

Column 6,
Line 57, after "first-out" insert -- output --

Signed and Sealed this

Twelfth Day of April, 2005

JON W. DUDAS
*Director of the United States Patent and Trademark Office*